(12) United States Patent
Murphy et al.

(10) Patent No.: US 10,795,531 B2
(45) Date of Patent: Oct. 6, 2020

(54) INTERFACE SYNCHRONIZATION SYSTEM AND METHOD

(71) Applicant: ADP, LLC, Roseland, NJ (US)

(72) Inventors: Shawn Murphy, New York, NY (US); Michael Syrquin, New York, NY (US); Fernando Santos, New York, NY (US); Jennifer Herman, Somerville, NJ (US); Diego Bonilla, New York, NY (US); Dianne Frommelt, New York, NY (US); Sarah Iodice, New York, NY (US); Allison Harrison, New York, NY (US); Charles Lafferty, New York, NY (US); Kimberly Wyman, New York, NY (US); Nancy Ressler, New York, NY (US); Steven Petros, New York, NY (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/265,865

(22) Filed: Feb. 1, 2019

(65) Prior Publication Data
US 2020/0249797 A1    Aug. 6, 2020

(51) Int. Cl.
*G06F 3/0481* (2013.01)
*G06F 3/0484* (2013.01)
*G06Q 30/00* (2012.01)

(52) U.S. Cl.
CPC .......... *G06F 3/0481* (2013.01); *G06F 3/0484* (2013.01); *G06Q 30/016* (2013.01)

(58) Field of Classification Search
CPC ... H04L 67/1095; H04W 4/021; G06Q 30/01; G06Q 10/06; G06Q 30/0244; G06F 3/038
See application file for complete search history.

(56) References Cited

U.S. PATENT DOCUMENTS

| | | |
|---|---|---|
| 5,956,024 A | 9/1999 | Strickland et al. |
| 2005/0193055 A1 | 9/2005 | Angel et al. |
| 2010/0070336 A1* | 3/2010 | Koegler ................. G06Q 10/06 705/7.29 |
| 2010/0257451 A1* | 10/2010 | Halevi ................... G06F 3/038 715/733 |

(Continued)

OTHER PUBLICATIONS

Losert, "Customer Care UI/User Experience on Behance", Interaction Design, UI/UX, Web Design, accessed on Nov. 14, 2018, 13 pages. https://www.behance.net/gallery/14852505/Customer-Care-US-User-Experience.

*Primary Examiner* — Toan H Vu
(74) *Attorney, Agent, or Firm* — Yee & Associates, P.C.

(57) ABSTRACT

A method, an apparatus, a system, and a computer program product for synchronizing a display context across a plurality of customer service applications. A computer system receives a service request from a first customer over one of a plurality of communication channels. The computer system accesses a first customer service ticket within a first customer context displayed in a first graphical user interface of a first customer service application. The computer system accesses a set of customer service tools within the first customer context displayed in a second graphical user interface of a second application. The computer system synchronizes the display context across both the first graphical user interface of the first application and the second graphical user interface of the second application.

18 Claims, 17 Drawing Sheets

(56) References Cited

U.S. PATENT DOCUMENTS

| | | | |
|---|---|---|---|
| 2011/0063317 A1* | 3/2011 | Gharaat | G06Q 30/0244 |
| | | | 345/545 |
| 2012/0150547 A1* | 6/2012 | Parker, III | G06Q 30/01 |
| | | | 705/1.1 |
| 2015/0032889 A1* | 1/2015 | Chan | H04L 67/1095 |
| | | | 709/224 |
| 2017/0085642 A1* | 3/2017 | Grue | H04L 67/1095 |
| 2018/0234496 A1* | 8/2018 | Ratias | H04L 67/22 |
| 2018/0359315 A1* | 12/2018 | Mujibiya | H04L 67/1095 |
| 2019/0163431 A1* | 5/2019 | Rodriguez | H04W 76/10 |
| 2019/0238635 A1* | 8/2019 | Ng | H04L 67/1095 |
| 2019/0297452 A1* | 9/2019 | Gedikian | H04W 4/021 |

* cited by examiner

⊘ Earnest Smith ⊗ | ⊕ New Client

Service Requests (3) | Draft 01 | ⊕ New SR

600 ↗

602 ↗

| Place | ⊘ Inbound: Earnest Smith (Talking) (00:00) | Ready (00:22) |

Answer | Release | Retrieve | Hold | Transfer | Conference | DTMF | Mark Done | »

AE-AEORC
SOUTHEAST (✎ Edit)

Risk
⊘ Low

Client Contact (✎ Edit)
Earnest Smith
412-555-4655 x58836
earnest.smith@ae.com

Account ID
070503

Account Type
MWNSC

EID
AEAEOPR

Region / Co. Code
0060 / YYC

NAN
070503

New Service Request — 1004

Status   Date Opened
Open         04/02/2018

Apply Template

Template Visibility
[Please Select ▼]

Group / Super Type*
[MAS Service ▼]

Asset / Product*
[AutoPay ~10 ▼]

Abstract / Subject*
Update on paycheck delivery status

Description
Update on paycheck delivery status
Informed her that they were signed up for by Hill @ 11:10AM on 03/22/2018

⌄ Additional Information

Owner (✎ Edit)
Kimberly Sims
kimberly.sims@abc.com

⇄ LINK   ↗ LINK
         1010

( CREATE/UPDATE SR TEMPLATE )

Topic / Type*
[Payroll Processing ▼]

Version
[Please Select ▼]

Reason / SubType*    Source* ↘ 1008
[                ▼]      [Call - Incoming ▼]

Delivery Status
[Please Select ▼]

Sub Status
[Please Select ▼]

( SAVE )

Earnest Smith ⊗ | ⊕ New Client | Place | ⊙ Inbound: Amelia Downs (Ringing) (00:00) | Ready (00:17)

*(904)*

Service Requests (3) Draft 01

Answer | Release | Retrieve | Hold | Transfer | Conference | DTMF | Mark Done

AE-AEORC
SOUTHEAST (✎ Edit)

Risk
⊘ Low

Client Contact (✎ Edit)
Earnest Smith
412-555-4655 x58836
earnest.smith@ae.com

Account ID
070503

Account Type
MWNSC

EID
AEAEOPR

Region / Co. Code
0060 / YYC

NAN
0705503

Interaction Details:

Caller ID /
Phone # Entered:    Caller Name:    Company Name:    Authentication Status:
4125554655    Amelia Downs    General Energy Co.    ⊙

Call Reason:    SR / CRM:    Call Source:    Queue Time:    Caller Region / Branch / Co. Code:
NA    NA / Clarify    Inbound    0 hr 0 min 1 sec    /0060/YYC

IID/PR Contact:    Call Type / Routing:    Tenure / Last Call:    Region / Phone # Dialed / Language:    Migrated From MAS Client:
NA / NA    General    Date / Client Status: NA / NA / NA    NA / 6000 / NA    NA

N8 Tax Enabled:
☐ NA

MAS Service ▽    Payroll Processing ▽    Delivery Status ▽    Call - Incoming ▽

Asset / Product*    Version    Sub Status
AutoPay ~10 ▽    *Please Select*    *Please Select* ▽

Abstract / Subject*
Update on paycheck delivery status

Description

○ Earnest Smith ⊗ | ⊘ Amelia Downs ⊗ | ⊕ New Client

| Place | ⊘ Inbound: Amelia Downs (Ringing) (00:00) | | | | | | | Ready (00:22) |
|---|---|---|---|---|---|---|---|---|
| | Answer | Release | Retrieve | Hold | Transfer | Conference | DTMF | Mark Done |

Service Requests (3) | Draft 01 | ⊕ New SR

GENERAL
ENERGY CO. ( ✎ Edit )

Risk
⊘ Low

Client Contact ( ✎ Edit )
Amelia Downs
518-555-4500
amelia.downs@ge.com

Account ID
157755

Account Type
Standalone AVS

EID
GENERALENERGY

Region / Co. Code
0137 / GECO

NAN
ST

New Service Request

Status          Date Opened
Open                04/02/2018

Owner ( ✎ Edit )
Kimberly Sims
kimberly.sims@abc.com

1004

→ LINK  ⤢ LINK
       1010

Apply Template
[Please Select ▾]

Template Visibility
[Please Select ▾]

Group / Super Type*
[Please Select ▾]

Asset / Product*
[Please Select ▾]

Abstract / Subject*
[                    ]

Description
[                    ]

Topic / Type*
[Please Select ▾]

Version
[Please Select]

( CREATE/UPDATE SR TEMPLATE )

Reason / SubType*            Source*
[Please Select ▾]            [Please Select ▾]

Sub Status
[Please Select ▾]

1002

INTERFACE SYNCHRONIZATION SYSTEM AND METHOD

BACKGROUND INFORMATION

1. Field

The present disclosure relates generally to customer support interactions and, in particular, to a method, an apparatus, a system, and a computer program for synchronizing a display context across a plurality of customer service applications.

2. Background

Companies often provide customer support to customers by accepting service requests and providing resolutions for these service requests. Companies need to provide superior customer support more quickly and efficiently.

Oftentimes, customer service representatives need to access several tools, programs, and websites at the same time to troubleshoot client calls, chats, and e-mails. Juggling multiple windows is time-consuming and error-prone, often extending time needed to adequately resolve the issues. This delay can negatively impact client satisfaction. Currently available systems and methods for managing service requests and identifying possible resolutions for these service requests may not be as fast or as accurate as desired.

Therefore, it would be desirable to have a method and apparatus that take into account at least some of the issues discussed above, as well as other possible issues. For example, it would be desirable to have a method and apparatus that overcome a technical problem with the time and accuracy involved with supporting customer service requests.

SUMMARY

An embodiment of the present disclosure provides a computer implemented method for synchronizing a display context across a plurality of customer service applications. A computer system receives a service request from a first customer over one of a plurality of communication channels. The computer system accesses a first customer service ticket within a first customer context displayed in a first graphical user interface of a first customer service application. The computer system accesses a set of customer service tools within the first customer context displayed in a second graphical user interface of a second application. The computer system synchronizes the display context across both the first graphical user interface of the first application and the second graphical user interface of the second application.

Another embodiment of the present disclosure provides a computer system for synchronizing a display context across a plurality of customer service applications. The computer system comprises a hardware processor and a customer service system in communication with the hardware processor. The customer service system receives a service request from a first customer over one of a plurality of communication channels. The customer service system accesses a first customer service ticket within a first customer context displayed in a first graphical user interface of a first customer service application. The customer service system accesses a set of customer service tools within the first customer context displayed in a second graphical user interface of a second application. The customer service system synchronizes the display context across both the first graphical user interface of the first application and the second graphical user interface of the second application.

Yet another embodiment of the present disclosure provides a computer program product for synchronizing a display context across a plurality of customer service applications. The computer program product comprises a non-transitory computer readable storage media and program code stored on the non-transitory computer readable storage media.

The program code includes code for receiving a service request from a first customer over one of a plurality of communication channels. The program code includes code for accessing a first customer service ticket within a first customer context displayed in a first graphical user interface of a first customer service application. The program code includes code for accessing a set of customer service tools within the first customer context displayed in a second graphical user interface of a second application. The program code includes code for synchronizing the display context across both the first graphical user interface of the first application and the second graphical user interface of the second application.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 10 is a fifth illustration of a graphical user interface for a first customer service application in accordance with an illustrative embodiment;

FIG. 13 is a sixth illustration of a graphical user interface for a first customer service application in accordance with an illustrative embodiment;

FIG. 14 is a seventh illustration of a graphical user interface for a first customer service application in accordance with an illustrative embodiment;

FIG. 15 is an eighth illustration of a graphical user interface for a first customer service application in accordance with an illustrative embodiment

DETAILED DESCRIPTION

The illustrative embodiments provide a method, an apparatus, a system, and a computer program product for synchronizing a display context across a plurality of customer service applications. A computer system receives a service request from a first customer over one of a plurality of communication channels. The computer system access is a first customer service ticket within a first customer context displayed in a first graphical user interface of a first customer service application. The computer system accesses a set of customer service tools within the first customer context displayed in a second graphical user interface of a second application. The computer system synchronizes the display context across both the first graphical user interface of the first application and the second graphical user interface of the second application.

Figure 1:
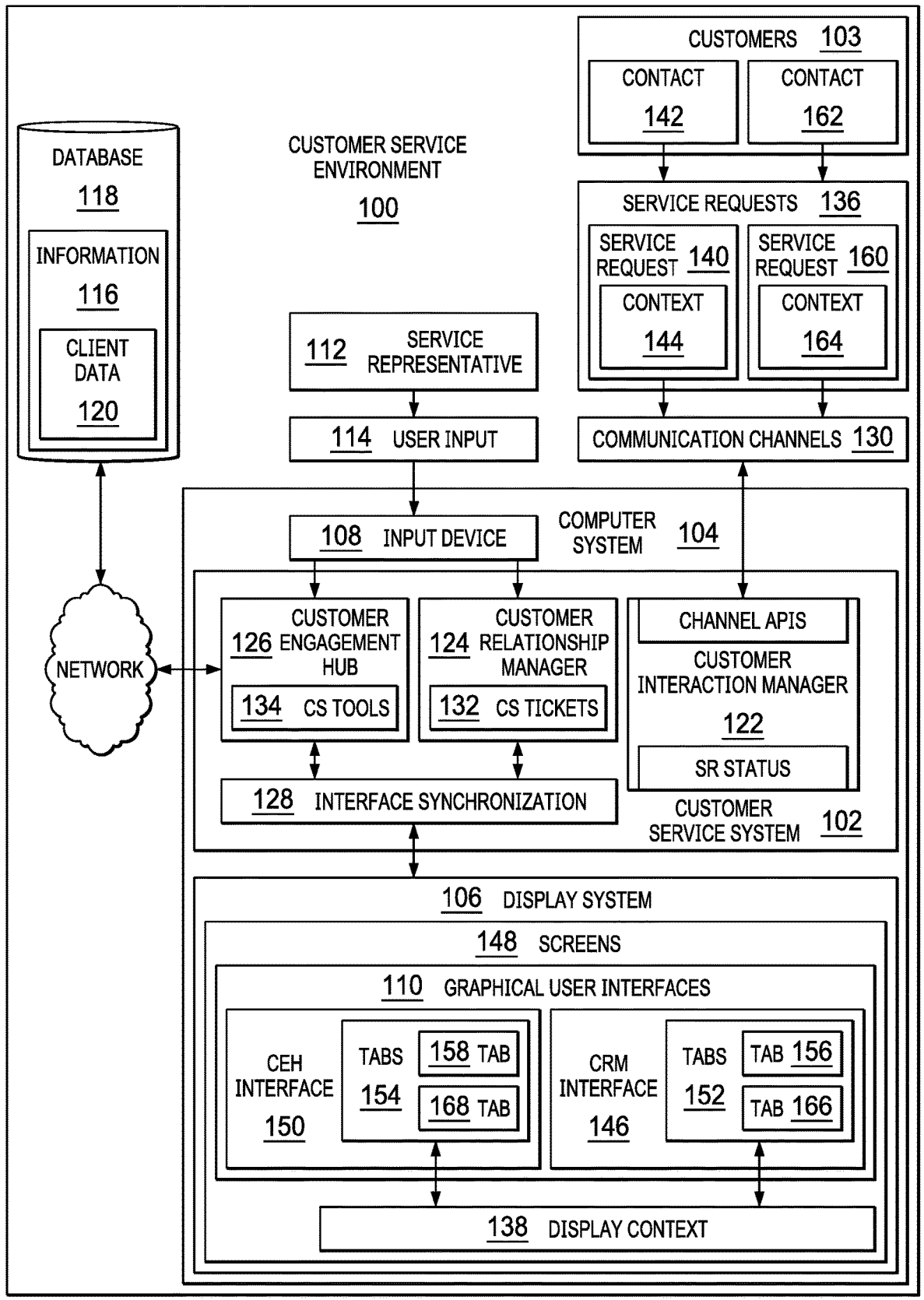
FIG. 1 is a block diagram of a customer service environment in accordance with an illustrative embodiment.

With reference now to the figures and, in particular, with reference to FIG. 1, a block diagram of a customer service environment is depicted in accordance with an illustrative embodiment. In this example, customer service environment 100 includes customer service system 102 which operates to manage and track interactions with customers 104.

In this illustrative example, customer service system 102 may be implemented in software, hardware, firmware, or a combination thereof. When software is used, the operations performed by customer service system 102 may be implemented in program code configured to run on hardware, such as a processor unit. When firmware is used, the operations performed by customer service system 102 may be implemented in program code and data and stored in persistent memory to run on a processor unit. When hardware is employed, the hardware may include circuits that operate to perform the operations in customer service system 102.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, customer service system 102 may be implemented in computer system 104. Computer system 104 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

In the illustrative example, display system 106 and input device 108 are in communication with computer system 104, and aid service representative 112 in interacting with customer service system 102.

Display system 106 is a hardware system and includes one or more display devices on which one or more of graphical user interfaces 110 may be displayed. The display devices may include at least one of a light-emitting diode display (LED), a liquid crystal display (LCD), an organic light-emitting diode display (OLED), or some other suitable device.

Service representative 112 may interact with graphical user interfaces 110 through user input 114 generated by input device 108. Input device 108 may be, for example, a mouse, a keyboard, a trackball, a touchscreen, a stylus, or some other suitable type of input device.

In this illustrative example, customer service system 102 provides access to information 116 stored in database 118. In this illustrative example, information 116 includes client data 120 about customers 104. Client data 120 may include, for example, at least one of information about people, products, research, product analysis, business plans, financials, or other information relating to or used by customers 104. Client data 120 may be generated by one of an employee information system, a research information system, a sales information system, an accounting system, a payroll system, or some other type of system that is externally located from customer service system 102.

As depicted, information 116 is stored in database 118. In this illustrative example, database 118 may be a storage system in a single location or may be distributed. Database 118 is a collection of data. Database 118 may be a relational database containing a collection of schemas, tables, queries, reports, views, and other elements. Database 118 can be accessed by a software application, such as a database management system. Customer service system 102 may include the database management system. In other illustrative examples, other software in customer service system 102 may directly access information 116 stored in database 118.

In this illustrative example, customer service system 102 includes a number of different components. As depicted, customer service system 102 includes customer interaction manager 122, customer relationship manager 124, customer engagement hub 126, and interface synchronization 128.

Customer interaction manager 122 is a software application responsible for managing interactions with customers 104. Customer interaction manager 122 enables service representative 112 to communicate with customers 103 across multiple different ones of communication channels 130, such as, but not limited to, e-mail, SMS messaging, telephone, instant messaging, and social media.

Customer relationship manager 124 is a software application responsible for managing business processes associated with a business-customer relationship with customers 104. Customer relationship manager 124 may manage business processes related to, for example, but not limited to, customer data, customer interactions, business information, sales information, customer contacts, and customer support, as well as other suitable types of business processes. As depicted, customer relationship manager 124 generates and manages customer service tickets 132.

Customer engagement hub 126 is a software application that consolidates and provides access to a number of customer service tools 134. Customer service tools 134 provide access and management of client data 120. By consolidating customer service tools 134, customer engagement hub 126 improves engagement of customers 103 by providing service representative 112 with contextually relevant client data 120, enabling a faster fulfilment of service requests 136.

Interface synchronization 128 is a software application that synchronizes display context 138 across graphical user interfaces 110. For example, when service representative 112 performs an action in a particular one of graphical user interfaces 110, interface synchronization 128 synchronizes other graphical user interfaces 110 according to display context 138 of the particular one of graphical user interfaces 110 in which the action is performed.

In this manner, customer services system 102 synchronizes display context 138 across a plurality of customer service applications, such as customer interaction manager 122, customer relationship manager 124, and customer engagement hub 126.

Customer service system 102 receives service request 140 from a first customer over one of a plurality of communication channels 130. In this illustrative example, service request 140 is received from contact 142.

Customer service system 102 accesses a first customer service ticket within a first customer context 144. The first customer context 144 is displayed in a first graphical user interface of a first customer service application. For example, service representative 112 can access the customer service ticket using customer relationship manager (CRM) interface 146 of customer relationship manager 124, displayed on one of screens 148.

Customer service system 102 accesses a set of customer service (CS) tools 134 within the first customer context 144. The set of customer service (CS) tools 134 are displayed in a second graphical user interface of a second application. For example, customer engagement hub 126 accesses customer service tools 134 within context 144. Customer engagement hub 126 displays customer service tools 134 in customer engagement hub (CEH) interface 150 within the first customer context 144.

Interface synchronization 128 synchronizes display context 138 across both the first graphical user interface of the first application and the second graphical user interface of the second application. For example, interface synchronization 128 synchronizes display context 138 across CRM interface 146 of customer relationship manager 124 and CEH interface 150 of customer engagement hub 126.

In this manner, interface synchronization 128 ensures that service representative 112 is presented with a consistent one of context 144 across multiple ones of graphical user interfaces 110 when interacting with contact 142 to fulfill service request 140. In this manner, interface synchronization 128 ensures that customer service (CS) tickets 132 and customer service (CS) tools 134 are presented according to context 144. Interface synchronization 128 ensures that client data 120 accessed by customer service (CS) tools 134 and displayed on CEH interface 150 is consistent with customer service (CS) tickets 132 accessed by customer relationship manager 124 and displayed in CRM interface 146.

In this manner, interface synchronization 128, in conjunction with graphical user interfaces 110, imparts a specific functionality directed to a specific implementation of a solution to a problem in the software arts, ensuring that information accessed in different applications are displayed according to a common context. Interface synchronization 128, in conjunction with graphical user interfaces 110, presents information on display system 106 in a particular manner, resulting in an improved user interface for electronic devices. Therefore, interface synchronization 128 imparts a specific improvement over prior systems resulting in a specific improvement to the way computer system 102 operates.

In an illustrative example, interface synchronization 128 synchronizes display context 138 in response to user input 114. Customer service system 102 receives user input 114 into either CRM interface 146 or CEH interface 150. User input 114 is received within context 144 of a first one of customers 104. Responsive to receiving user input 114, interface synchronization 128 synchronizes the display context 138 across both CRM interface 146 and CEH interface 150 based on context 144 of a first one of customers 103 in which user input 114 is received.

In an illustrative example, customer service system 102 accesses customer service tickets 132 and customer service (CS) tools 134 within context 144 by opening corresponding tabs 152 and 154 within the different ones of graphical user interfaces 110. Interface synchronization 128 opens tab 156 in CRM interface 146. Tab 156 is associated with context 144. Customer service system 102 accesses customer service (CS) tickets 132 within context 144, as displayed in tab 156 of CRM interface 146.

Interface synchronization 128 opens tab 158 in CEH interface 150. Tab 158 is associated with context 144. Customer service system 102 accesses the set of customer service (CS) tools 134 within context 144 as displayed in tab 158 of CEH interface 150.

In an illustrative example, service request 140 is a first service request accessed within context 144 of a first one of customers 103. In this illustrative example, customer service system 102 receives a second one of service request 160 from a second ones of customers 103 over one of a plurality of communication channels 130. In this illustrative example, service request 160 is received from contact 162.

Customer service system 102 accesses a second customer service ticket within context 164 of a second one of customers 103. The second customer service ticket is displayed according to context 164 in CRM interface 146 for customer relationship manager 124.

Customer service system 102 accesses a set of customer service (CS) tools 134 within context 164 of a second one of customers 103. The set of customer service (CS) tools 134 is displayed according to context 164 in CEH interface 150 for customer engagement hub 126.

Interface synchronization 128 synchronizes display context 138 in response to user input 114. Customer service system 102 receives user input 114 into either CRM interface 146 or CEH interface 150. User input 114 is received within context 164 of the second one of customers 103.

Responsive to receiving user input 114, interface synchronization 128 synchronizes display context 138 across both CRM interface 146 and CEH interface 150 based on context 164 of the second one of customers 103 in which user input 114 is received.

In an illustrative example, customer service system 102 accesses customer service (CS) tickets 132 and customer service (CS) tools 134 within context 164 by opening corresponding tabs 152 and 154 within the different one of graphical user interfaces 110.

Interface synchronization 128 opens tab 166 in CRM interface 146. Tab 166 is associated with context 164. Customer service system 102 accesses customer service (CS) tickets 132 within context 164 as displayed in tab 166 of CRM interface 146.

Interface synchronization 128 opens tab 168 in CEH interface 150. Tab 168 is associated with context 164. Customer service system 102 accesses the set of customer service (CS) tools 134 within context 164 as displayed in tab 168 of CEH interface 150.

Continuing with the illustrative example, customer service system 102 synchronizes display context 138 based on user input 114 in one of context 144 or 164.

For example, when customer service system 102 receives user input 114 into either of tab 156 of CRM interface 146 or tab 158 of CEH interface 150, interface synchronization 128 synchronizes display context 138 to display both of tab 156 of CRM interface 146 and tab 158 of CEH interface 150. In this manner, interface synchronization 128 ensures context 144 is consistent across customer relationship manager 124 and customer engagement hub 126.

Similarly, when customer service system 102 receives user input 114 into either of tab 166 of CRM interface 146 or tab 168 of CEH interface 150, interface synchronization 128 synchronizes display context 138 to display both of tab 166 of CRM interface 146 and tab 168 of CEH interface 150. In this manner, interface synchronization 128 ensures context 164 is consistent across customer relationship manager 124 and customer engagement hub 126.

As a result, computer system 104 operates as a special purpose computer system in which customer service system 102 in computer system 104 enables processing and fulfillment of service requests 136 more efficiently. In particular, interface synchronization 128 transforms computer system 104 into a special purpose computer system as compared to currently available general computer systems that do not have interface synchronization 128.

Figure 2:
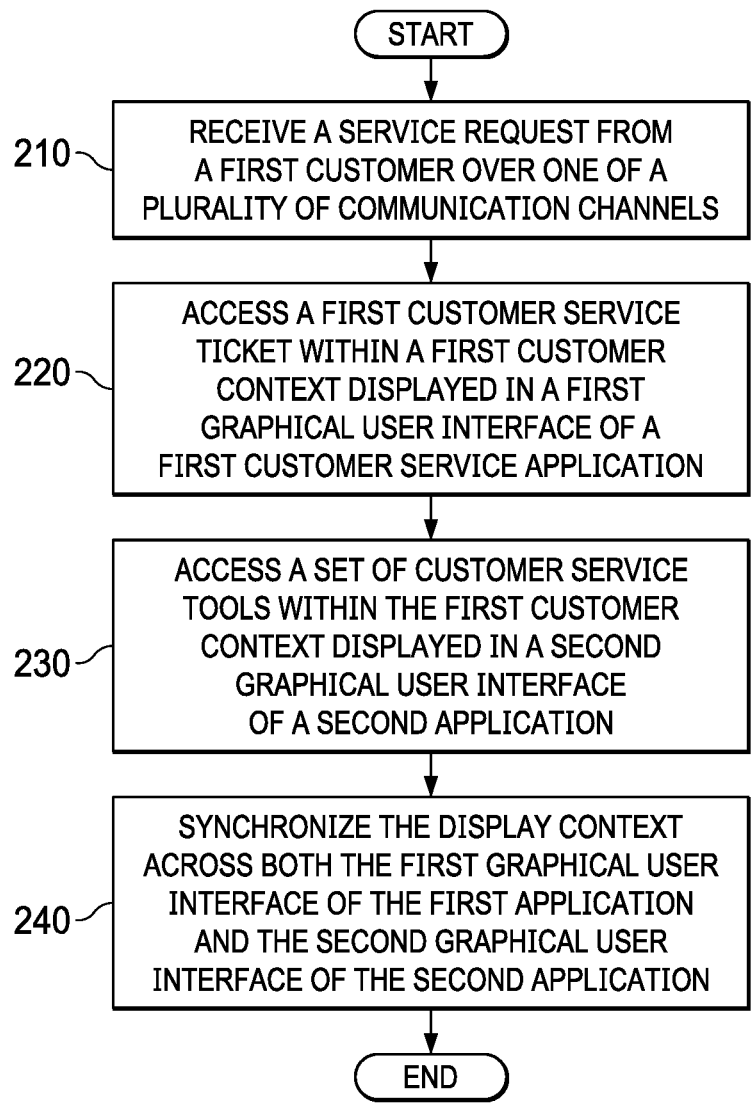
FIG. 2 is a flowchart of a high-level process for synchronizing a display context across a plurality of customer service applications in accordance with an illustrative embodiment.

With reference to FIG. 2, a flowchart of a high-level process for synchronizing a display context across a plurality of customer service applications is depicted in accordance with an illustrative embodiment. The processes in FIG. 2 can be implemented in hardware, software, or both. When implemented in software, the processes can take the form of program code that is run by one or more processor units located in one or more hardware devices in one or more computer systems. For example, these processes can be implemented in customer service system 102 running on computer system 104 in FIG. 1.

The process begins by receiving a service request from a first customer over one of a plurality of communication channels (step 210). The service request can be service request 140 received over one of communication channels 130 of FIG. 1.

The process accesses a first customer service ticket within a first customer context displayed in a graphical user interface of a first customer service application (step 220). The first customer service ticket can be a customer service ticket such as one of customer service tickets 132 of FIG. 1. The customer service ticket is accessed within a first context, such as context 144, and displayed in a graphical user interface, such as CRM interface 146 of customer relationship manager 124, all shown in FIG. 1.

The process accesses a set of customer service tools within the first customer context displayed in a second graphical user interface of a second application (step 230). The set of customer service tools can be customer service tools 134 of FIG. 1. The customer service tools are accessed within a first context, such as context 144, and displayed in the graphical user interface, such as CEH interface 150 of customer engagement hub 126, all shown in FIG. 1.

The process synchronizes the display context across both the first graphical user interface of the first application and the second graphical user interface of the second application (step 240), with the process terminating thereafter. In this manner, the process ensures that information accessed by different applications are displayed according to a common context.

Figure 3:
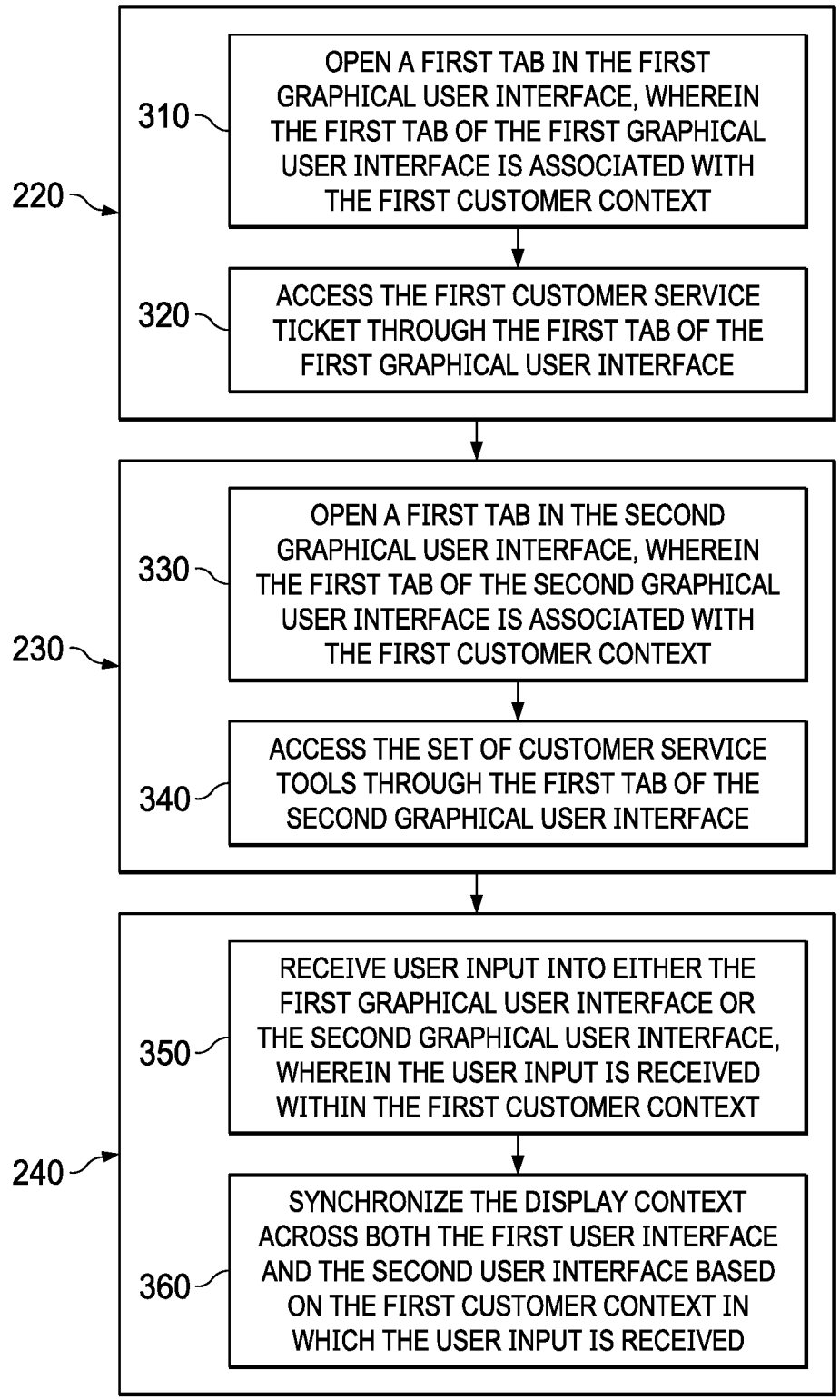
FIG. 3 is a flowchart of a process for synchronizing a display context across a plurality of customer service applications in accordance with an illustrative embodiment.

With reference to FIG. 3, a flowchart of a process for synchronizing a display context across a plurality of customer service applications is depicted in accordance with an illustrative embodiment. The processes in FIG. 3 is a more detailed embodiment of process steps 220, 230, and 240 in FIG. 2.

In an illustrative example, the process accesses a first customer service ticket within a first customer context displayed in a graphical user interface of a first customer service application (step 220). As part of accessing the first customer ticket, the process opens a first tab in the first graphical user interface (step 310). The first tab of the first graphical user interface is associated with the first customer context. The process then accesses the first customer service ticket through the first tab of the first graphical user interface (step 320).

In an illustrative example, the process accesses a set of customer service tools within the first customer context displayed in a second graphical user interface of a second application (step 230). As part of accessing the set of customer service tools, the process opens a first tab in the second graphical user interface (step 330). The first tab of the second graphical user interface is associated with the first customer context. The process then accesses the set of customer tools through the first tab of the second graphical user interface (step 340).

In an illustrative example, the process synchronizes the display context across both the first graphical user interface of the first application and the second graphical user interface of the second application (step 240). As part of synchronizing the display context, the process receives user input into either the first graphical user interface or the second graphical user interface (step 350). In this illustrative example, the user input is received within the first customer context. The process then synchronizes the display context across both the first user interface and the second user interface based on the first customer context in which the user input is received (step 360).

Figure 4:
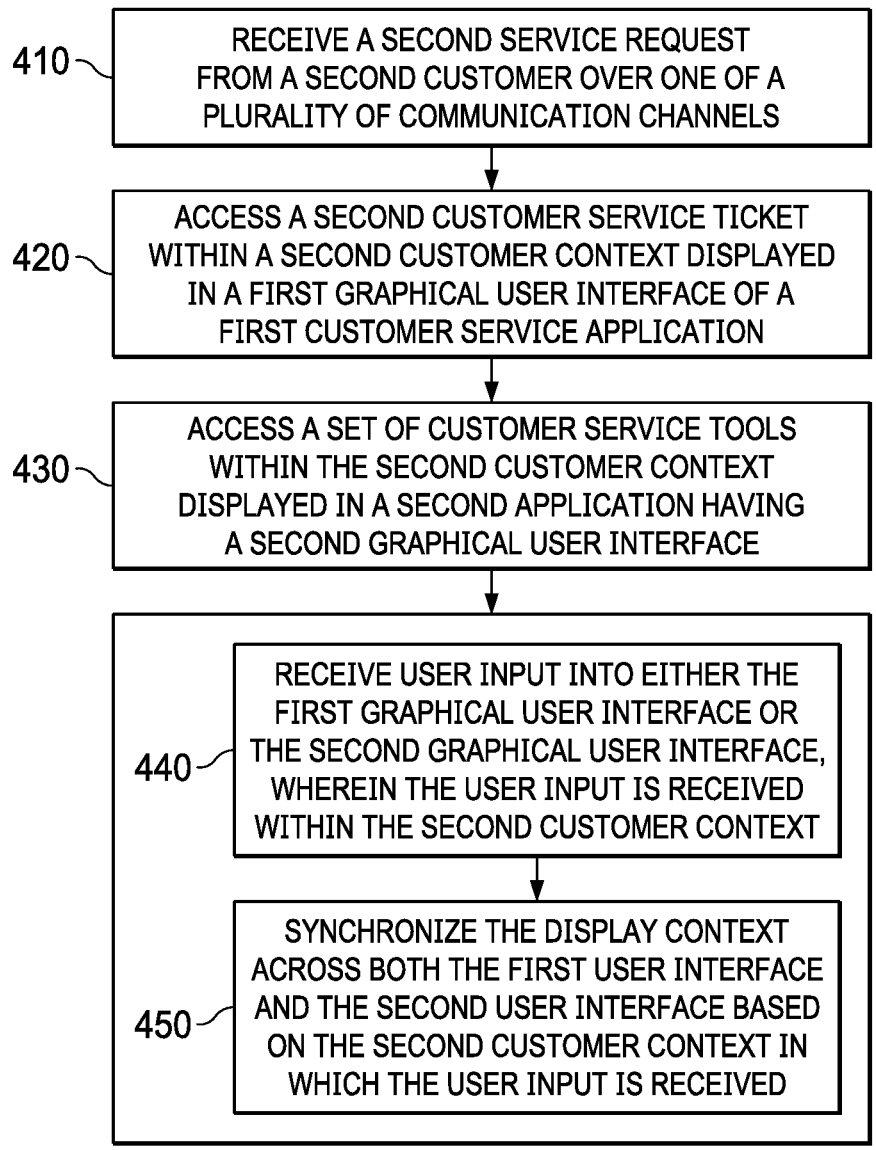
FIG. 4 is a flowchart of a high-level process for synchronizing a display context across a plurality of customer service requests and customer service applications in accordance with an illustrative embodiment.

With reference to FIG. 4, a flowchart of a high-level process for synchronizing a display context across a plurality of customer service requests and customer service applications is depicted in accordance with an illustrative embodiment. The process illustrated in FIG. 4 is an illustrative example of the process of FIG. 2, wherein the service request is a first service request accessed within a first customer context of a first customer.

The process receives a second service request from a second customer over a second one of a plurality of communication channels (step 410). The service request can be service request 160 received over one of communication channels 130 of FIG. 1.

The process accesses a second customer service ticket within a second customer context displayed in the graphical user interface of the first customer service application (step 420). The second customer service ticket can be a customer service ticket such as one of customer service tickets 132 of FIG. 1. The customer service ticket is accessed within a second context, such as context 164, and displayed in a graphical user interface, such as CRM interface 146 of customer relationship manager 124, all shown in FIG. 1 (step 420).

The process accesses a set of customer service tools within the second customer context displayed in the second graphical user interface of the second application (step 430). The set of customer service tools can be customer service tools 134 of FIG. 1. The customer service tools are accessed within a second context, such as context 164, displayed in the graphical user interface, such as CEH interface 150 of customer engagement hub 126, all shown in FIG. 1.

In an illustrative example, the process synchronizes the display context across both the first graphical user interface of the first application and the second graphical user interface of the second application (step 440). As part of synchronizing the display context, the process receives user input into either the first graphical user interface or the second graphical user interface. In this illustrative example, the user input is received within the second customer context. The process then synchronizes the display context across both the first user interface and the second user interface based on the second customer context in which the user input is received (step 450).

Figure 5:
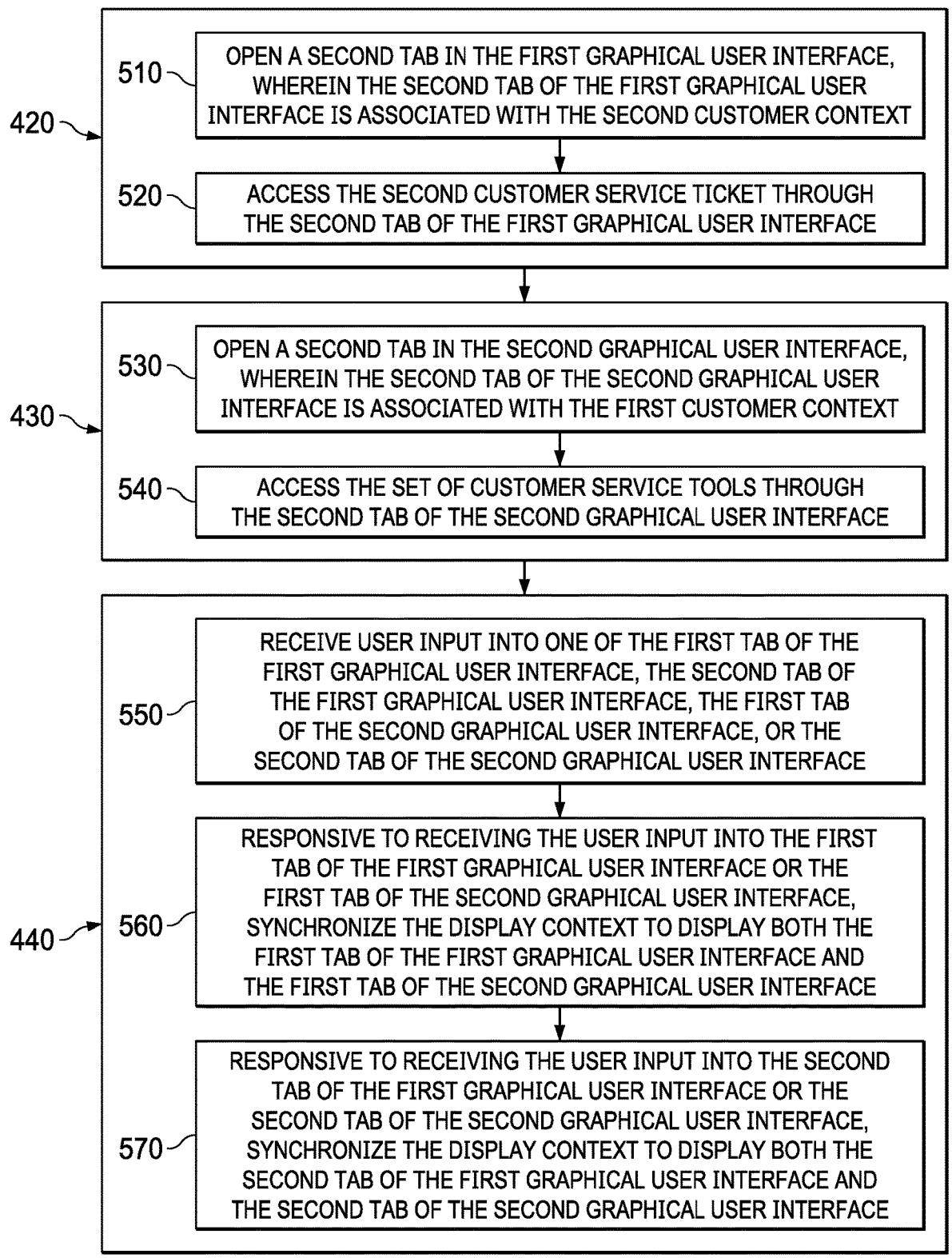
FIG. 5 is a flowchart of a process for synchronizing a display context across a plurality of customer service requests and customer service applications in accordance with an illustrative embodiment.

With reference to FIG. 5, a flowchart of a process for synchronizing a display context across a plurality of customer service requests and customer service applications is depicted in accordance with an illustrative embodiment. The processes in FIG. 5 is a more detailed embodiment of process steps 420, 430, and 440 in FIG. 4.

In an illustrative example, the process accesses a second customer service ticket within a second customer context displayed in a graphical user interface of a first customer service application (step 420). As part of accessing the second customer ticket, the process opens a second tab in the first graphical user interface (step 510). The second tab of the first graphical user interface is associated with the second customer context. The process then accesses the second customer service ticket through the second tab of the first graphical user interface (step 520).

In an illustrative example, the process accesses a set of customer service tools within the second customer context displayed in a second graphical user interface of a second application (step 530). As part of accessing the set of customer service tools, the process opens a second tab in the second graphical user interface (step 540). The second tab of the second graphical user interface is associated with the second customer context. The process then accesses the set of customer tools ticket through the second tab of the second graphical user interface (step 550).

In an illustrative example, the process synchronizes the display context across both the first graphical user interface of the first application and the second graphical user interface of the second application (step 560). As part of synchronizing the display context, the process receives user input into one of the first tab of the first graphical user interface, the second tab of the first graphical user interface, the first tab of the second graphical user interface, or the second tab of the second graphical user interface (step 570). Responsive to receiving the user input into the first tab of the first graphical user interface or the first tab of the second graphical user interface, the process synchronizes the display context to display both the first tab of the first graphical user interface and the first tab of the second graphical user interface (step 580). Responsive to receiving the user input into the second tab of the first graphical user interface or the second tab of the second graphical user interface, the process synchronizes the display context to display both the second tab of the first graphical user interface and the second tab of the second graphical user interface (step 590).

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 6:
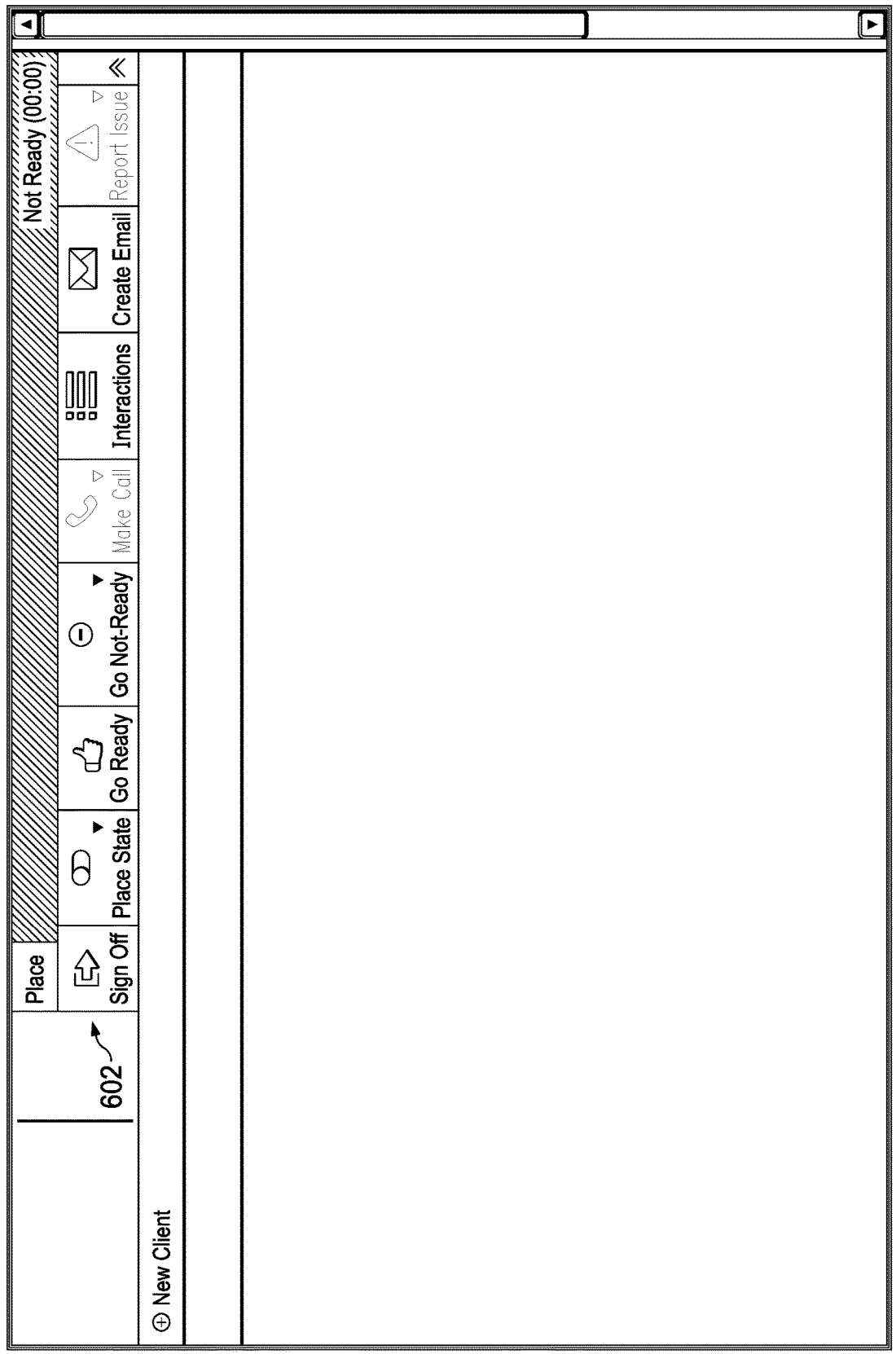
FIG. 6 is a first illustration of a graphical user interface for a first customer service application in accordance with an illustrative embodiment.

Turning now to FIG. 6, a first illustration of a graphical user interface for a first customer service application is depicted in accordance with an illustrative embodiment. Graphical user interface 600 is an example of one of graphical user interfaces 110, shown in block form in FIG. 1. As depicted, graphical user interface 600 is an example of CRM interface 146 in FIG. 1.

A service representative, such as service representative 112 in FIG. 1, uses graphical user interface 600 to manage business processes associated with a business-customer relationship, for example, but not limited to, customer data, customer interactions, business information, sales information, customer contacts, and customer support, as well as other suitable types of business processes. As depicted, a service representative uses graphical user interface 600 to generate and manage customer service tickets.

Graphical user interface 600 is illustrated in an initial "not ready" SR status. When a service representative is ready to accept a service request, the service representative changes the initial SR status by interacting with one of graphical controls 602.

Figure 7:
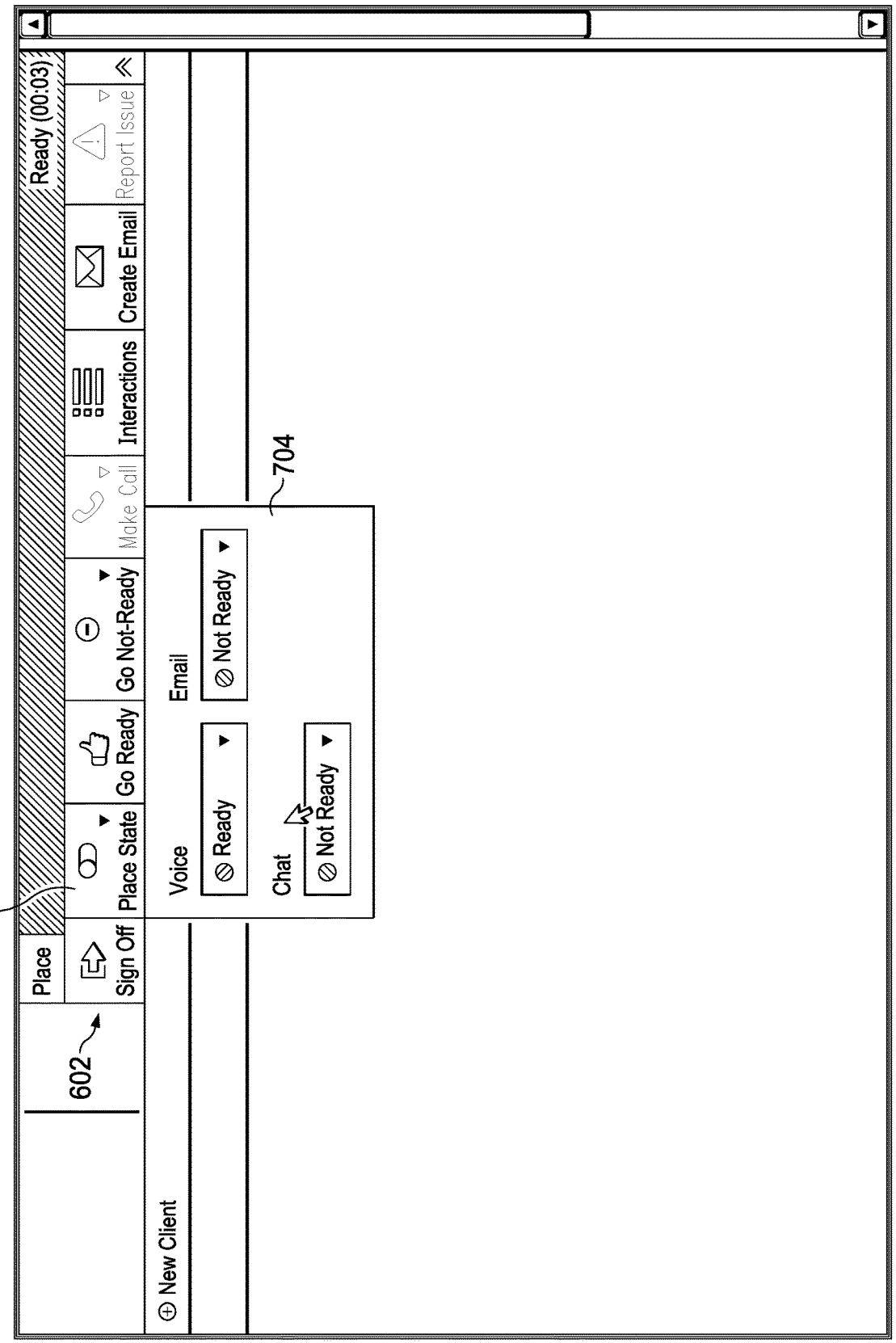
FIG. 7 is a second illustration of a graphical user interface for a first customer service application in accordance with an illustrative embodiment.

Turning now to FIG. 7, a second illustration of a graphical user interface for a first customer service application is depicted in accordance with an illustrative embodiment. As depicted, a service representative has selected graphical control 702. In response, graphical user interface 600 displays pop-up window 704. Pop-up window 704 allows the service representative to select one or more communication channels over which a service request is to be received.

Figure 8:
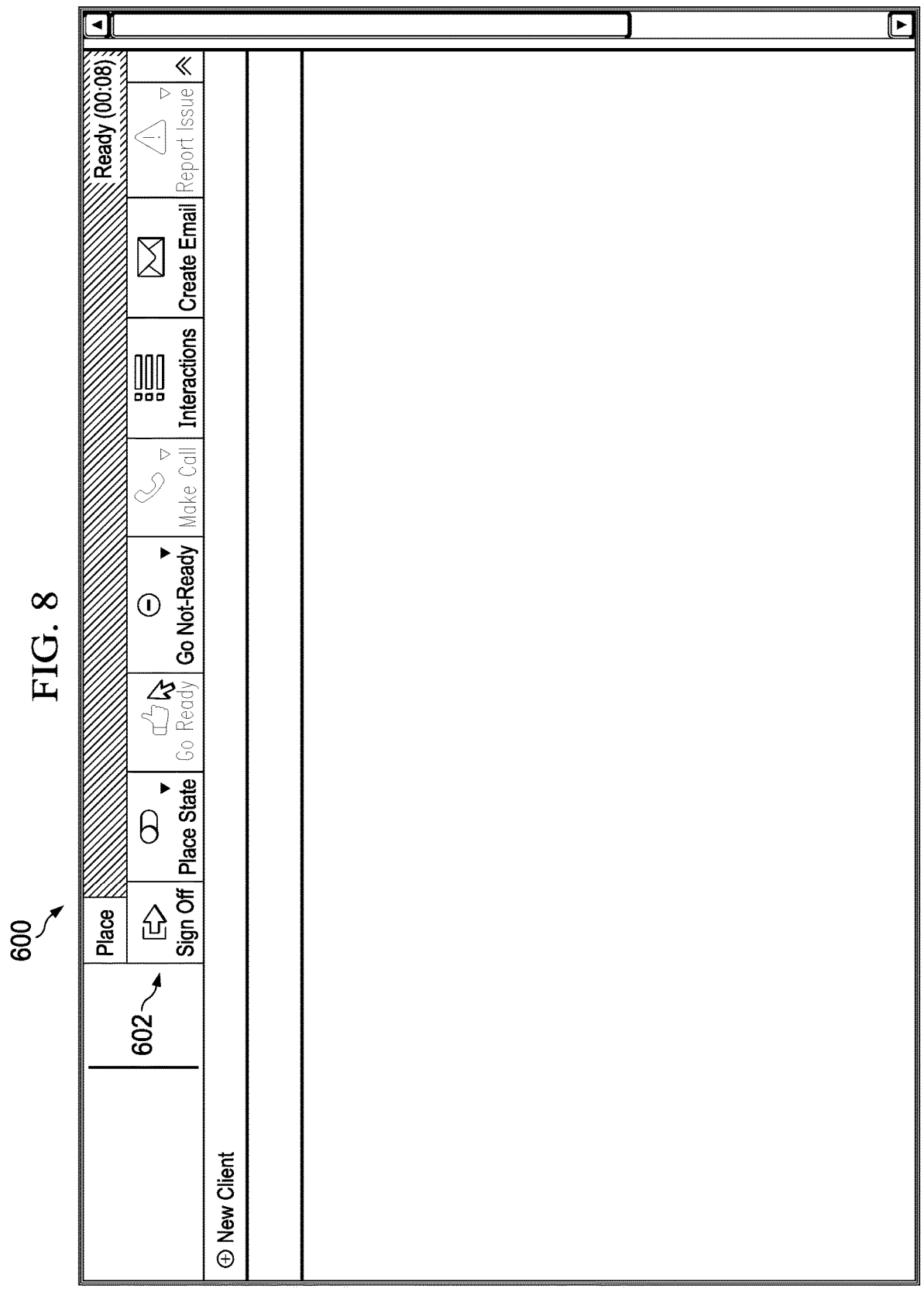
FIG. 8 is a third illustration of a graphical user interface for a first customer service application in accordance with an illustrative embodiment.

Turning now to FIG. 8, a third illustration of a graphical user interface for a first customer service application is depicted in accordance with an illustrative embodiment. As depicted, a service representative has one or more communication channels displayed in pop-up window 704 of FIG. 7. Graphical user interface 600 is illustrated in a "ready" SR status, indicating that the service representative is available to receive service requests over the selected communication channels.

Figure 9:
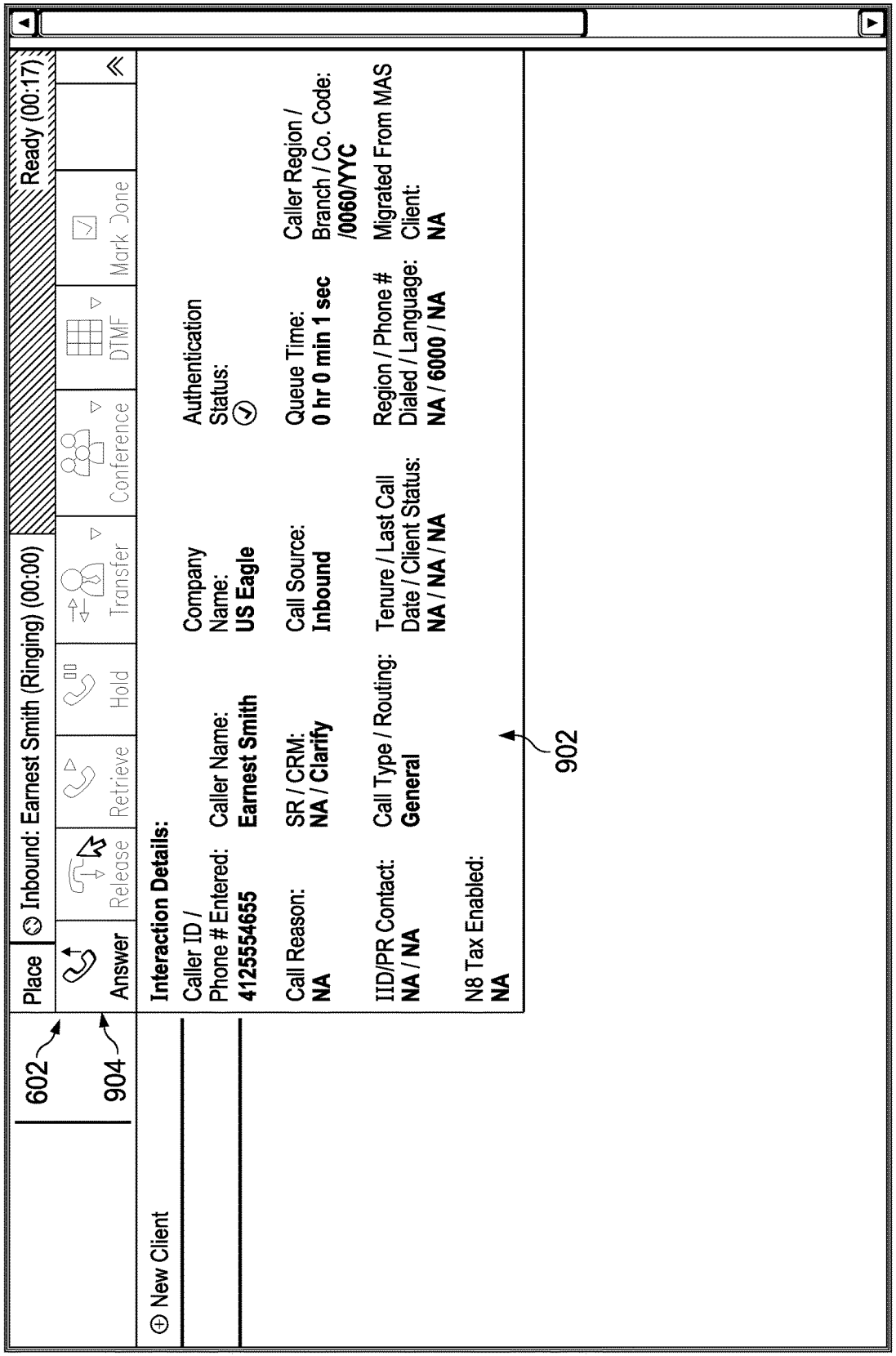
FIG. 9 is a fourth illustration of a graphical user interface for a first customer service application is in accordance with an illustrative embodiment.

Turning now to FIG. 9, a fourth illustration of a graphical user interface for a first customer service application is depicted in accordance with an illustrative embodiment. As depicted, a service request has been received.

In this illustrative example, a customer service application, such as customer relationship manager 124 of FIG. 1, retrieves portions of client data and contact data, and displays this information in pop-up window 902. When a service representative is ready to accept the service request, the service representative can "answer" the request by interacting with graphical controls 904.

Figure 10:
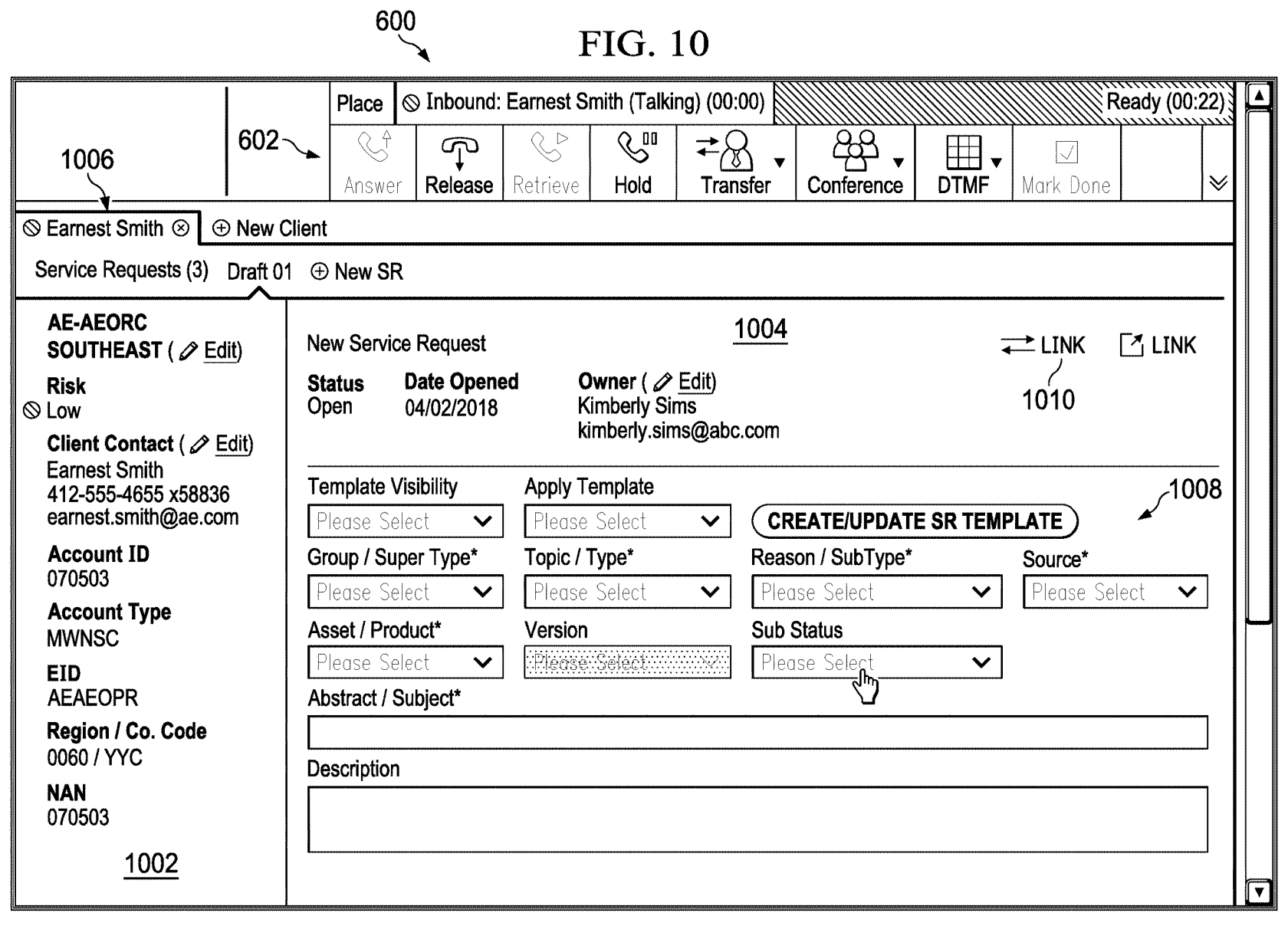

Turning now to FIG. 10, a fifth illustration of a graphical user interface for a first customer service application is depicted in accordance with an illustrative embodiment. As depicted, the service request received in FIG. 8 has been answered.

As depicted, graphical user interface 600 displays client information section 1002 and service ticket section 1004. Both client information section 1002 and service ticket section 1004 are displayed within a context of the service request, as contained within tab 1006.

Client information section 1002 displays portions of client data and contact data that were previously presented in pop-up window 902. In this manner, client information section 1002 provides a reminder to a service representative of relevant client and contact information, thereby promoting positive customer interactions.

As depicted, graphical user interface 600 displays graphical controls 1008 in service ticket section 1004. A service representative interacts with graphical controls 1008 to populate a customer service ticket with relevant information sought by the customer and services provided to the customer.

As depicted, graphical user interface 600 includes engagement hub link 1010. Engagement hub link 1010 is a graphical control that starts a second customer service application.

Figure 11:
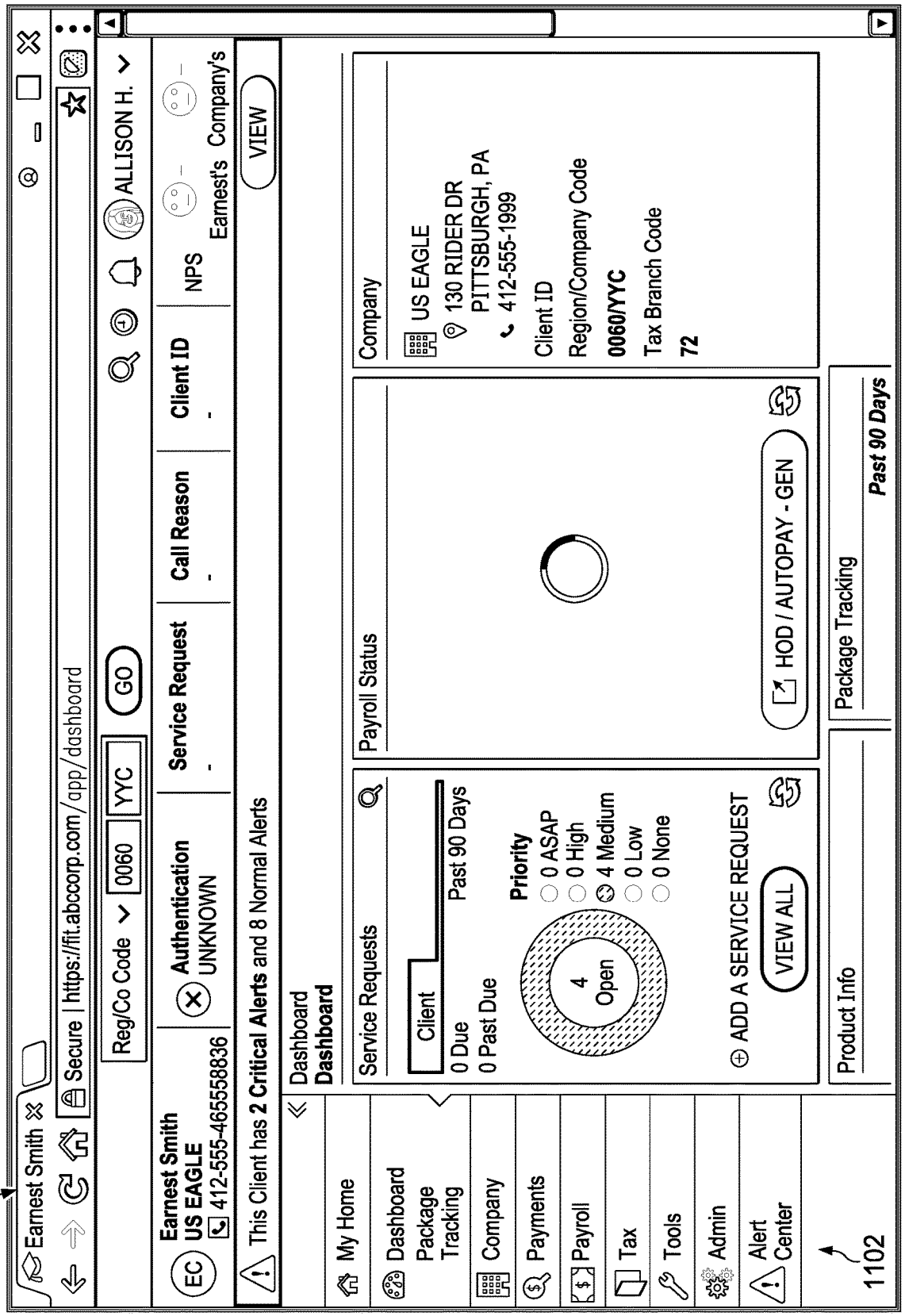
FIG. 11 is a first illustration of a graphical user interface for a second customer service application in accordance with an illustrative embodiment.

Turning now to FIG. 11, a first illustration of a graphical user interface for a second customer service application is depicted in accordance with an illustrative embodiment. Graphical user interface 1100 is an example of one of graphical user interfaces 110, shown in block form in FIG. 1. As depicted, graphical user interface 1100 is an example of CEH interface 150 in FIG. 1. Graphical user interface 1100 can be displayed in response to a service representative interaction with engagement hub link 1010 of FIG. 10.

Graphical user interface 1100 provides access to a number of customer service tools 1102 for accessing and managing client data. Graphical user interface 1100 improves customer engagement by consolidating customer service tools 1102 into a single interface and providing the service representative with contextually relevant client data, enabling a faster fulfillment of service requests. As depicted, graphical user interface 1100 displays customer service tools 1102 within a context of the service request, as contained within tab 1104.

An interface synchronization, such as interface synchronization 128 of FIG. 1, synchronizes the display context of graphical user interface 600 of FIGS. 6-10 and graphical user interface 1100. For example, when user input is received into either of tab 1006 of graphical user interface 600 or tab 1104 of graphical user interface 1100, the display context is synchronized across both graphical user interfaces.

Figure 12:
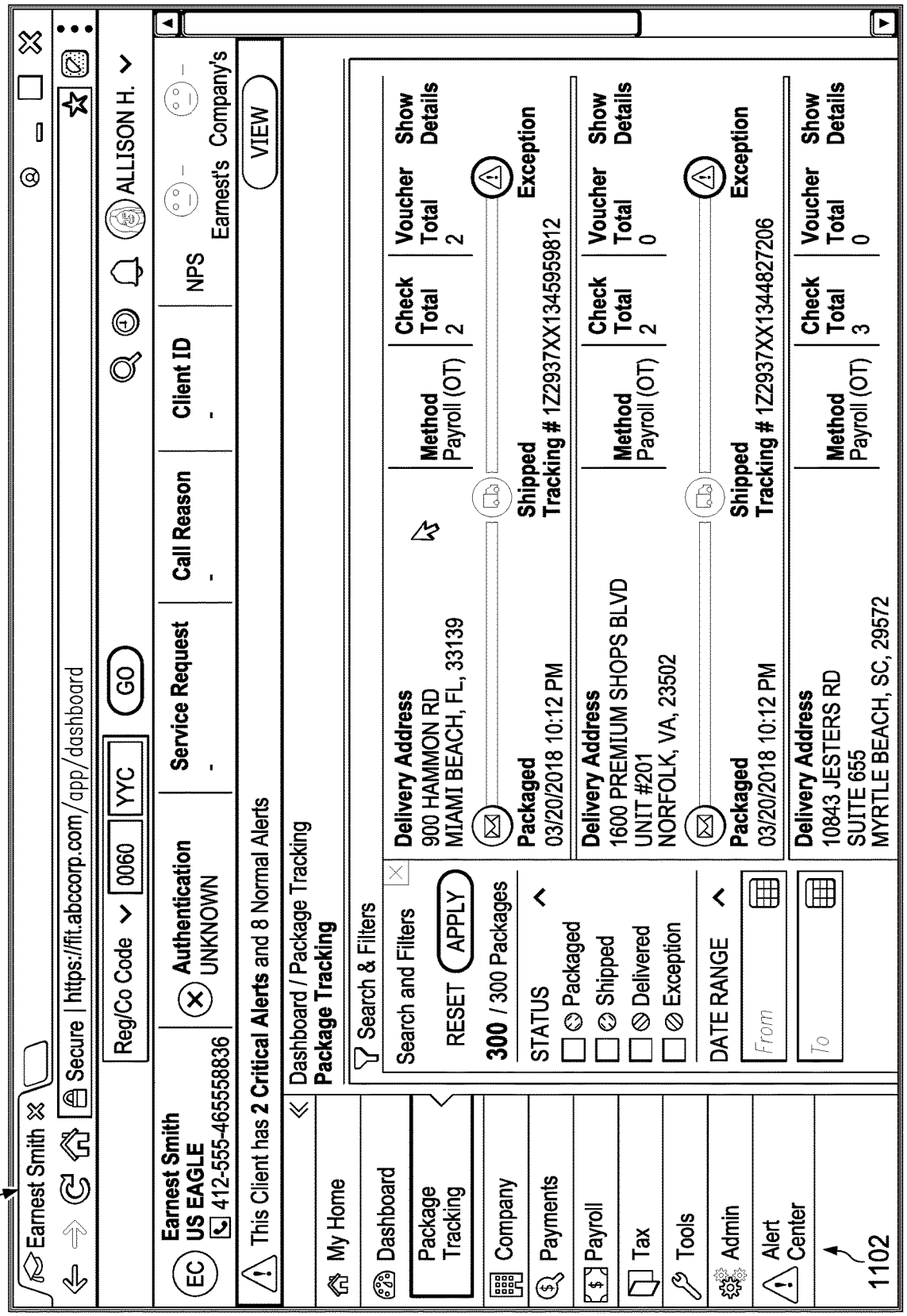
FIG. 12 is a second illustration of a graphical user interface for a second customer service application in accordance with an illustrative embodiment.

Turning now to FIG. 12, a second illustration of a graphical user interface for a second customer service application is depicted in accordance with an illustrative embodiment. As depicted, a service representative has selected one of customer service tools 1102 of FIG. 11. In response, graphical user interface 1100 displays client data relevant to customer service tools 1102 within the context of the service request.

Turning now to FIG. 13, a sixth illustration of a graphical user interface for a first customer service application is depicted in accordance with an illustrative embodiment. As depicted, the service representative returned to graphical user interface 600 to populate graphical controls 1008 of the customer service ticket with relevant information, such as information accessed using customer service tools 1102 of FIG. 11, accessed and provided in servicing the service request.

Turning now to FIG. 14, a seventh illustration of a graphical user interface for a first customer service application is depicted in accordance with an illustrative embodiment. As depicted, a second service request has been received.

In this illustrative example, a customer service application, such as customer relationship manager 124 of FIG. 1, retrieves portions of client data and contact data, and displays this information in pop-up window 1402. Information in pop-up window 1402 is provided according to the context of the incoming service request. When a service representative is ready to accept the service request, the service representative can "answer" the request by interacting with graphical controls 904.

Turning now to FIG. 15, an eighth illustration of a graphical user interface for a first customer service application is depicted in accordance with an illustrative embodiment. As depicted, the second service request received in FIG. 14 has been answered.

As depicted, graphical user interface 600 displays client information section 1002 and service ticket section 1004. Both client information section 1002 and service ticket section 1004 are displayed within a context of the service request, as contained within tab 1502.

Client information section 1002 displays portions of client data and contact data that were previously presented in pop-up window 1402. A service representative interacts with graphical controls 1008 to populate a customer service ticket within a context of the service request, as contained within tab 1502.

Figure 16:
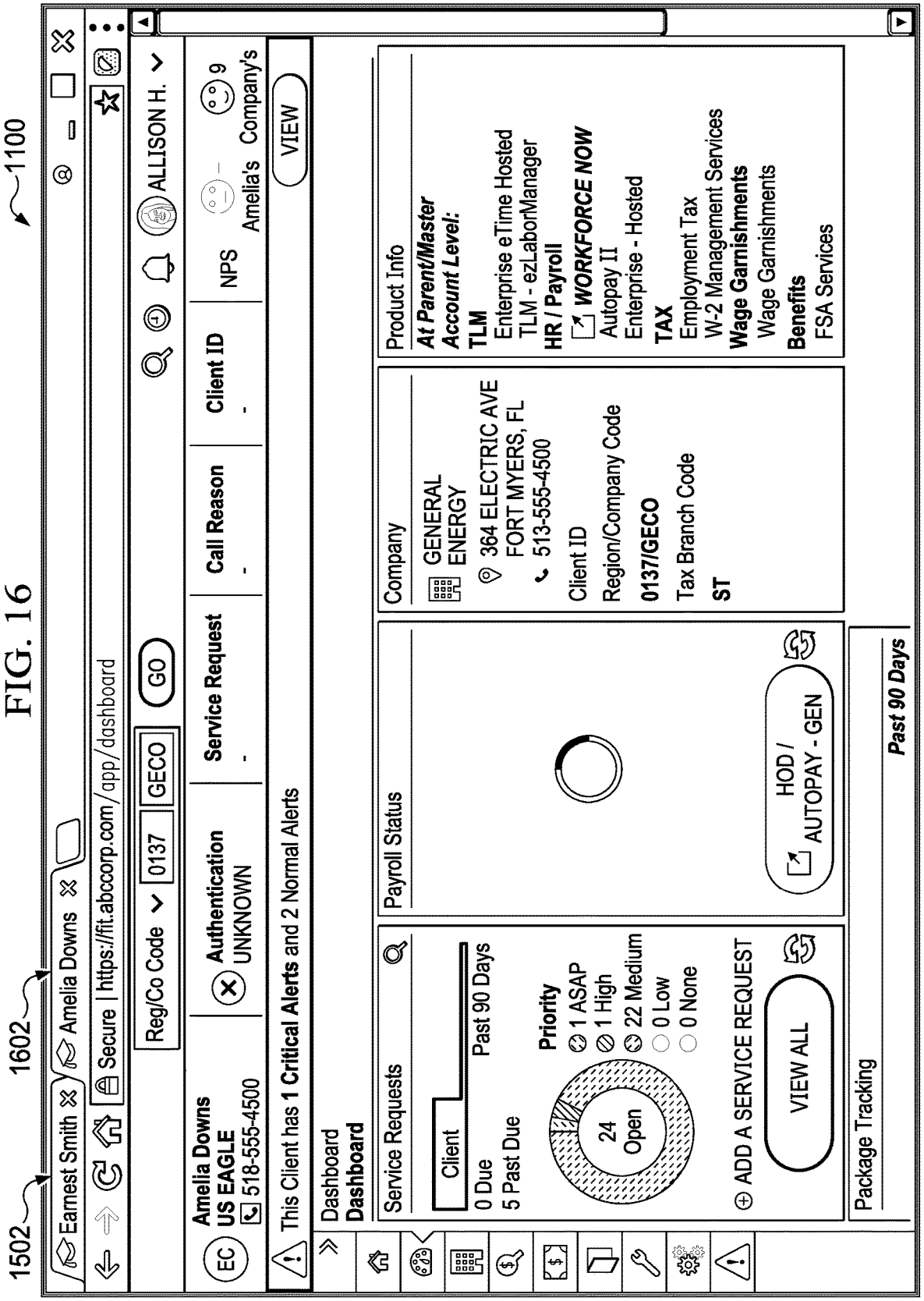
FIG. 16 is a third illustration of a graphical user interface for a second customer service application in accordance with an illustrative embodiment.

Turning now to FIG. 16, a third illustration of a graphical user interface for a second customer service application is depicted in accordance with an illustrative embodiment. Graphical user interface 1100 can be displayed in response to service representative interaction, within the context of the service request, with engagement hub link 1010 of FIG. 14.

As depicted, graphical user interface 1100 displays customer service tools 1102 within a context of the service request, as contained within tab 1602. An interface synchronization, such as interface synchronization 128 of FIG. 1, synchronizes the display context of graphical user interface 600 and graphical user interface 1100. For example, when user input is received into either of tab 1502 of graphical user interface 600 or tab 1602 of graphical user interface 1100, the display context is synchronized across both graphical user interfaces.

Figure 17:
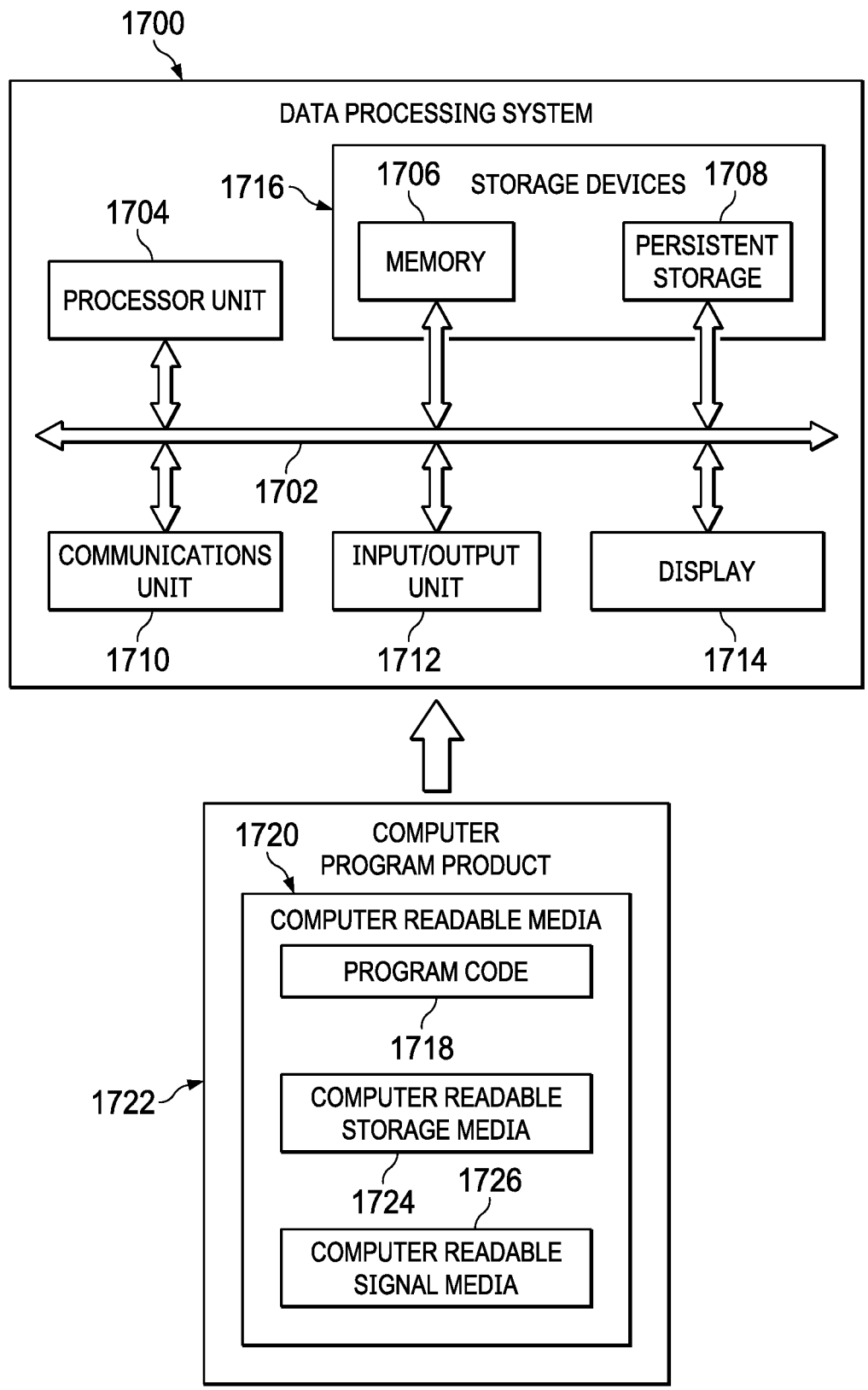
FIG. 17 is a block diagram of a data processing system in accordance with an illustrative embodiment.

Turning now to FIG. 17, a block diagram of a data processing system is depicted in accordance with an illustrative embodiment. Data processing system 1700 may be used to implement computer system 104 in FIG. 1. In this illustrative example, data processing system 1700 includes communications framework 1702, which provides communications between processor unit 1704, memory 1706, persistent storage 1708, communications unit 1710, input/output unit 1712, and display 1714. In this example, communications framework 1702 may take the form of a bus system.

Processor unit 1704 serves to execute instructions for software that may be loaded into memory 1706. Processor unit 1704 may be a number of processors, a multi-processor core, or some other type of processor, depending on the particular implementation.

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, may be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a solid-state drive (SSD), a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different embodiments may be performed by processor unit 1704 using computer-implemented instructions, which may be located in a memory, such as memory 1706.

These instructions are referred to as program code, computer usable program code, or computer-readable program code that may be read and executed by a processor in processor unit 1704. The program code in the different embodiments may be embodied on different physical or computer-readable storage media, such as memory 1706 or persistent storage 1708.

Program code 1718 is located in a functional form on computer-readable media 1720 that is selectively removable and may be loaded onto or transferred to data processing system 1700 for execution by processor unit 1704. Program code 1718 and computer-readable media 1720 form computer program product 1722 in these illustrative examples. In the illustrative example, computer-readable media 1720 is computer-readable storage media 1724.

In these illustrative examples, computer-readable storage media 1724 is a physical or tangible storage device used to store program code 1718 rather than a medium that propagates or transmits program code 1718.

Alternatively, program code 1718 may be transferred to data processing system 1700 using a computer-readable signal media. The computer-readable signal media may be, for example, a propagated data signal containing program code 1718. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code 1718.

Thus, the illustrative examples provide a method, an apparatus, a system, and a computer program product for synchronizing a display context across a plurality of customer service applications. In one illustrative example, a computer system receives a service request from a first customer over one of a plurality of communication channels. The computer system access is a first customer service ticket within a first customer context displayed in a first graphical user interface of a first customer service application. The computer system accesses a set of customer service tools within the first customer context displayed in a second graphical user interface of a second application. The computer system synchronizes the display context across both the first graphical user interface of the first application and the second graphical user interface of the second application.

In this manner, the computer system ensures that a service representative is presented with a consistent context across multiple graphical user interfaces of different customer service applications when interacting with a client contact to fulfill a service request. The computer system ensures that customer service tickets and customer service tools used to service those tickets are presented according to the particular client context of the service request. The computer system ensures that customer service tickets and client data accessed by customer service tools are consistently displayed across the multiple graphical user interfaces.

In this manner, the computer system imparts a specific functionality directed to a specific implementation of a solution to a problem in the software arts, ensuring that information accessed in different applications is displayed according to a common context. The computer system presents information in a particular manner, resulting in an improved user interface for electronic devices. Therefore, the computer system imparts a specific improvement over prior systems resulting in a specific improvement to the way the computer system operates.

In one illustrative example, one or more technical solutions are present that overcome a technical problem with the time and expense involved in accessing different information across different applications. As a result, one or more technical solutions may provide a technical effect of at least one of increasing speed, reducing cost, or reducing errors in processing of service requests.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for synchronizing a display context across a plurality of customer service applications, the method comprising:
   receiving a service request from a first customer over one of a plurality of communication channels;
   accessing a first customer service ticket within a first customer context displayed in a first graphical user interface of a first customer service application, including:
      opening a first tab in the first graphical user interface, wherein the first tab of the first graphical user interface is associated with the first customer context; and
      accessing the first customer service ticket through the first tab of the first graphical user interface;
   accessing a set of customer service tools within the first customer context displayed in a second graphical user interface of a second application, including:
      opening a first tab in the second graphical user interface, wherein the first tab of the second graphical user interface is associated with the first customer context; and
      accessing the set of customer service tools through the first tab of the second graphical user interface; and
   synchronizing the display context across both the first graphical user interface of the first application and the second graphical user interface of the second application.

2. The method of claim 1, wherein synchronizing the display context further comprises:
   receiving user input into either the first graphical user interface or the second graphical user interface, wherein the user input is received within the first customer context; and
   responsive to receiving the user input, synchronizing the display context across both the first graphical user interface and the second graphical user interface based on the first customer context in which the user input is received.

3. The method of claim 1, wherein the service request is a first service request accessed within a first customer context of a first customer, the method further comprising:
   receiving a second service request from a second customer over one of a plurality of communication channels;
   accessing a second customer service ticket within a second customer context displayed in a first graphical user interface of a first customer service application; and
   accessing a set of customer service tools within the second customer context displayed in a second application having a second graphical user interface.

4. The method of claim 3, wherein synchronizing the display context further comprises:
   receiving user input into either the first graphical user interface or the second graphical user interface, wherein the user input is received within the second customer context; and
   responsive to receiving the user input, synchronizing the display context across both the first graphical user interface and the second graphical user interface based on the second customer context in which the user input is received.

5. The method of claim 3, wherein accessing the second customer service ticket within the second customer context further comprises:
   opening a second tab in the first graphical user interface, wherein the second tab of the first graphical user interface is associated with the second customer context; and
   accessing the second customer service ticket through the second tab of the first graphical user interface;
   wherein accessing the set of customer service tools within the second customer context further comprises:
      opening a second tab in the second graphical user interface, wherein the second tab of the second graphical user interface is associated with the second customer context; and
      accessing the set of customer service tools through the second tab of the second graphical user interface.

6. The method of claim 5, wherein synchronizing the display context further comprises:
   receiving user input into one of the first tab of the first graphical user interface, the second tab of the first graphical user interface, the first tab of the second graphical user interface, or the second tab of the second graphical user interface;
   responsive to receiving the user input into the first tab of the first graphical user interface or the first tab of the second graphical user interface, synchronizing the display context to display both the first tab of the first graphical user interface and the first tab of the second graphical user interface; and
   responsive to receiving the user input into the second tab of the first graphical user interface or the second tab of the second graphical user interface, synchronizing the display context to display both the second tab of the first graphical user interface and the second tab of the second graphical user interface.

7. A computer system for synchronizing a display context across a plurality of customer service applications, the computer system comprising:
 a hardware processor; and
 a customer service system in communication with the hardware processor, wherein the customer service system:
  receives a service request from a first customer over one of a plurality of communication channels;
  accesses a first customer service ticket within a first customer context displayed in a first graphical user interface of a first customer service application;
  accesses a set of customer service tools within the first customer context displayed in a second graphical user interface of a second application; and
  synchronizes the display context across both the first graphical user interface of the first application and the second graphical user interface of the second application,
 wherein in accessing the first customer service ticket within the first customer context, the customer service system:
  opens a first tab in the first graphical user interface, wherein the first tab of the first graphical user interface is associated with the first customer context; and
  accesses the first customer service ticket through the first tab of the first graphical user interface;
 wherein in accessing the set of customer service tools within the first customer context, the customer service system:
  opens a first tab in the second graphical user interface, wherein the first tab of the second graphical user interface is associated with the first customer context; and
  accesses the set of customer service tools through the first tab of the second graphical user interface.

8. The computer system of claim 7, wherein in synchronizing the display context, the customer service system:
 receives user input into either the first graphical user interface or the second graphical user interface, wherein the user input is received within the first customer context; and
 responsive to receiving the user input, synchronizes the display context across both the first graphical user interface and the second graphical user interface based on the first customer context in which the user input is received.

9. The computer system of claim 7, wherein the service request is a first service request accessed within a first customer context of a first customer, wherein the customer service system:
 receives a second service request from a second customer over one of a plurality of communication channels;
 accesses a second customer service ticket within a second customer context displayed in a first graphical user interface of a first customer service application; and
 accesses a set of customer service tools within the second customer context displayed in a second application having a second graphical user interface.

10. The computer system of claim 9, wherein in synchronizing the display context, the customer service system:
 receives user input into either the first graphical user interface or the second graphical user interface, wherein the user input is received within the second customer context; and
 responsive to receiving the user input, synchronizes the display context across both the first graphical user interface and the second graphical user interface based on the second customer context in which the user input is received.

11. The computer system of claim 9, wherein in accessing the second customer service ticket within the second customer context, the customer service system:
 opens a second tab in the first graphical user interface, wherein the second tab of the first graphical user interface is associated with the second customer context; and
 accesses the second customer service ticket through the second tab of the first graphical user interface;
 wherein in accessing the set of customer service tools within the second customer context, the customer service system:
  opens a second tab in the second graphical user interface, wherein the second tab of the second graphical user interface is associated with the second customer context; and
  accesses the set of customer service tools through the second tab of the second graphical user interface.

12. The computer system of claim 11, wherein in synchronizing the display context, the customer service system:
 receives user input into one of the first tab of the first graphical user interface, the second tab of the first graphical user interface, the first tab of the second graphical user interface, or the second tab of the second graphical user interface;
 responsive to receiving the user input into the first tab of the first graphical user interface or the first tab of the second graphical user interface, synchronizes the display context to display both the first tab of the first graphical user interface and the first tab of the second graphical user interface; and
 responsive to receiving the user input into the second tab of the first graphical user interface or the second tab of the second graphical user interface, synchronizes the display context to display both the second tab of the first graphical user interface and the second tab of the second graphical user interface.

13. A computer program product for synchronizing a display context across a plurality of customer service applications, the computer program product comprising:
 a computer readable storage media;
 program code, stored on the computer readable storage media, for receiving a service request from a first customer over one of a plurality of communication channels;
 program code, stored on the computer readable storage media, for accessing a first customer service ticket within a first customer context displayed in a first graphical user interface of a first customer service application, including:
  code for opening a first tab in the first graphical user interface, wherein the first tab of the first graphical user interface is associated with the first customer context; and
  code for accessing the first customer service ticket through the first tab of the first graphical user interface;

program code, stored on the computer readable storage media, for accessing a set of customer service tools within the first customer context displayed in a second graphical user interface of a second application, including:
   code for opening a first tab in the second graphical user interface, wherein the first tab of the second graphical user interface is associated with the first customer context; and
   code for accessing the set of customer service tools through the first tab of the second graphical user interface; and
program code, stored on the computer readable storage media, for synchronizing the display context across both the first graphical user interface of the first application and the second graphical user interface of the second application.

14. The computer program product of claim 13, wherein the program code for synchronizing the display context further comprises:
   program code, stored on the computer readable storage media, for receiving user input into either the first graphical user interface or the second graphical user interface, wherein the user input is received within the first customer context; and
   program code, stored on the computer readable storage media, for synchronizing the display context across both the first graphical user interface and the second graphical user interface based on the first customer context in which the user input is received in response to receiving the user input.

15. The computer program product of claim 13, wherein the service request is a first service request accessed within a first customer context of a first customer, the computer program product further comprising:
   program code, stored on the computer readable storage media, for receiving a second service request from a second customer over one of a plurality of communication channels;
   program code, stored on the computer readable storage media, for accessing a second customer service ticket within a second customer context displayed in a first graphical user interface of a first customer service application; and
   program code, stored on the computer readable storage media, for accessing a set of customer service tools within the second customer context displayed in a second application having a second graphical user interface.

16. The computer program product of claim 15, wherein the program code for synchronizing the display context further comprises:
   program code, stored on the computer readable storage media, for receiving user input into either the first graphical user interface or the second graphical user interface, wherein the user input is received within the second customer context; and
   program code, stored on the computer readable storage media, for synchronizing the display context across both the first graphical user interface and the second graphical user interface based on the second customer context in which the user input is received in response to receiving the user input.

17. The computer program product of claim 15, wherein the program code for accessing the second customer service ticket within the second customer context further comprises:
   program code, stored on the computer readable storage media, for opening a second tab in the first graphical user interface, wherein the second tab of the first graphical user interface is associated with the second customer context; and
   program code, stored on the computer readable storage media, for accessing the second customer service ticket through the second tab of the first graphical user interface;
   wherein the program code for accessing the set of customer service tools within the second customer context further comprises:
      program code, stored on the computer readable storage media, for opening a second tab in the second graphical user interface, wherein the second tab of the second graphical user interface is associated with the second customer context; and
      program code, stored on the computer readable storage media, for accessing the set of customer service tools through the second tab of the second graphical user interface.

18. The computer program product of claim 17, wherein the program code for synchronizing the display context further comprises:
   program code, stored on the computer readable storage media, for receiving user input into one of the first tab of the first graphical user interface, the second tab of the first graphical user interface, the first tab of the second graphical user interface, or the second tab of the second graphical user interface;
   program code, stored on the computer readable storage media, for synchronizing the display context to display both the first tab of the first graphical user interface and the first tab of the second graphical user interface in response to receiving the user input into the first tab of the first graphical user interface or the first tab of the second graphical user interface; and
   program code, stored on the computer readable storage media, for synchronizing the display context to display both the second tab of the first graphical user interface and the second tab of the second graphical user interface in response to receiving the user input into the second tab of the first graphical user interface or the second tab of the second graphical user interface.

* * * * *